J. H. GENTER.
APPARATUS FOR AGITATING MATERIALS.
APPLICATION FILED MAY 29, 1913.
1,169,026.
Patented Jan. 18, 1916.
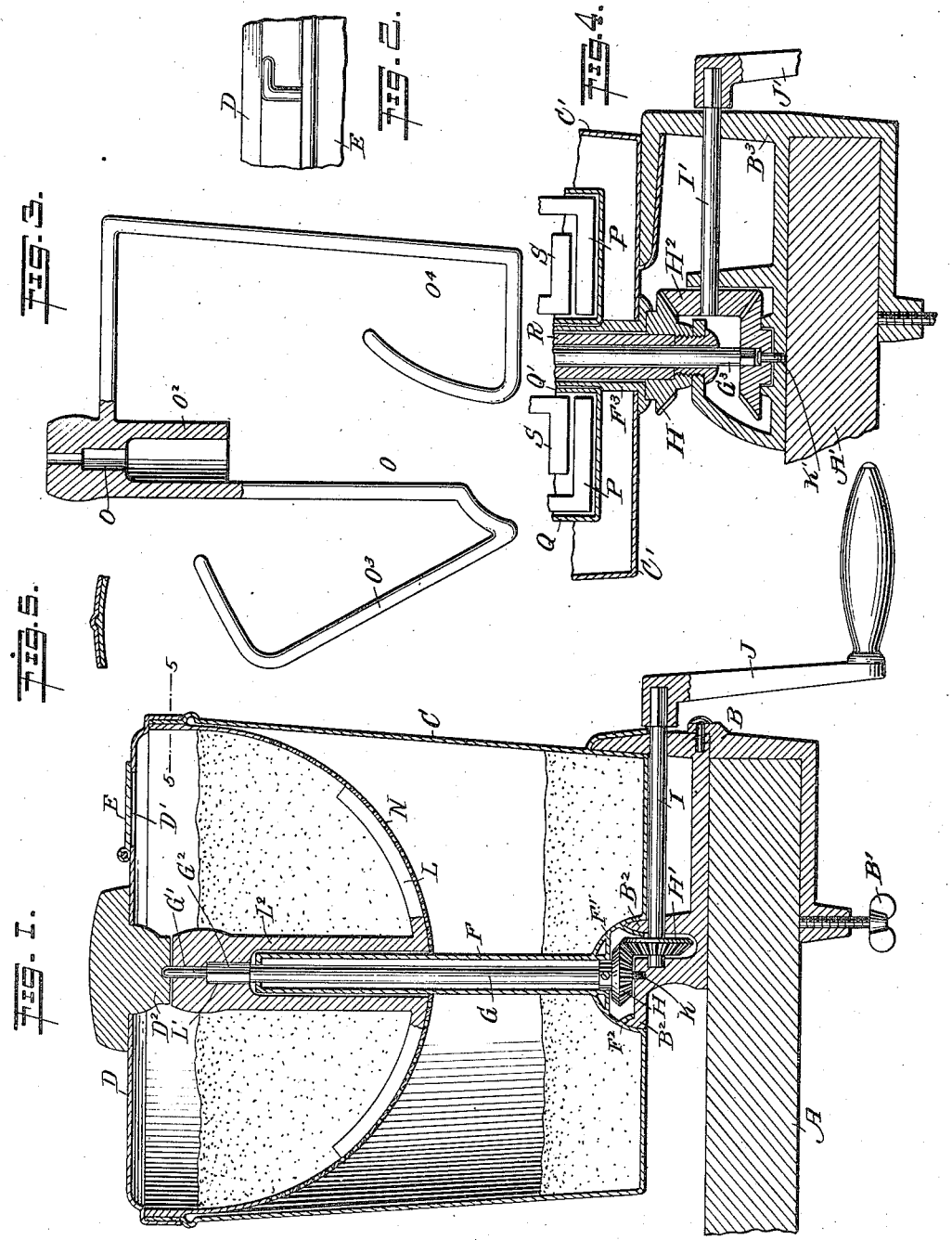
WITNESSES
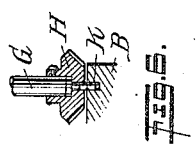
INVENTOR
Jacob H. Genter
BY
ATTORNEYS

UNITED STATES PATENT OFFICE.

JACOB H. GENTER, OF NEWBURGH, NEW YORK.

APPARATUS FOR AGITATING MATERIALS.

1,169,026.

Specification of Letters Patent.

Patented Jan. 18, 1916.

Application filed May 29, 1913. Serial No. 770,653.

*To all whom it may concern:*

Be it known that I, JACOB H. GENTER, a citizen of the United States, and a resident of Newburgh, in the county of Orange and State of New York, have invented a new and Improved Apparatus for Agitating Materials, of which the following is a full, clear, and exact description.

The object of the invention is to provide a new and improved apparatus, more especially designed for use in households as a flour sifter, dough mixer, egg beater, ice cream freezer and the like, and arranged to allow convenient and quick interchange of the parts to permit using the apparatus for the various purposes.

In order to accomplish the desired result, use is made of a stationary vessel provided with a central tube open at both ends, a vertical shaft extending through the said tube and receiving at its upper end removable agitating devices of various kinds, and a driving gear connected with the lower end of the said vertical shaft, to rotate the latter and the agitating devices.

A practical embodiment of the invention is represented in the accompanying drawings forming a part of this specification, in which similar characters of reference indicate corresponding parts in all the views.

Figure 1 is a sectional side elevation of the apparatus arranged as a flour sifter; Fig. 2 is a side elevation of the device for locking the cover in place on the upper end of the vessel; Fig. 3 is a side elevation of the stirrer for mixing dough and the like; Fig. 4 is a sectional side elevation of a modified form of the apparatus arranged as an ice cream freezer; Fig. 5 is a sectional plan view of the means for fastening the sieve and cover in position on the vessel; and Fig. 6 is an enlarged sectional side elevation of the bearing for the lower end of the vertical shaft.

On a table A is removably secured, by a set screw B', a support B, on which is fastened a vessel C adapted to be closed at the top by a cover D, having a filling opening D', covered by a door or slide E, and serving for placing materials in the vessel C, as hereinafter more fully explained. In the vessel C rises centrally a tube F, through which extends a vertical shaft G, provided at its lower end with a bevel gear wheel H, in mesh with a bevel gear wheel H', attached to a horizontally extending shaft I, journaled in the support B, and carrying at one outer end a crank arm J under the control of the operator for turning the driving shaft I, to rotate the vertical shaft G. The lower end of the shaft G is mounted on a bearing K, screwed or otherwise secured in the support B, and the upper reduced end G' of the shaft G has a bearing in a knob $D^2$, forming part of the cover D and projecting at the under side thereof. Adjacent to the reduced portion G' of the shaft G is formed on the latter a polygonal portion $G^2$, adapted to be engaged by a correspondingly shaped recess L', formed in the hub $L^2$ of an agitator L, operating over a sieve N, removably secured to the inside of the upper end of the vessel C. Now when the shaft G is rotated, the agitator L sweeps over the sieve N, so as to sift the flour or other material placed in the sieve, as indicated in Fig. 1. As shown in the drawing, the sieve N is spherical and the arms of the agitator L are segmental, to fit the inner surface of the sieve N. By the arrangement described, flour or like material placed in the sieve is sifted into the lower portion of the vessel C. When the desired amount of flour has been sifted into the vessel C, the cover D is removed and likewise the agitator L and the sieve N, and then another agitator O, such as shown, for instance, in Fig. 3, is placed in position on the upper end of the shaft G, to stir the flour and with it the water, milk or other ingredients placed in the vessel C. The agitator O is provided with a hub $O^2$, having a polygonal recess O', fitting the polygonal portion $G^2$ of the shaft G, so that when the latter is rotated the agitator is carried around with the shaft. From the hub $O^2$ extend agitating arms $O^3$, $O^4$, which come in contact with the flour or other ingredients, to stir the same with a view to form dough and to mix and knead the dough.

By reference to Figs. 1 and 3, it will be noticed that the large portion of the hub $O^2$ extends over the end of the fixed tube F, so that the materials contained in the vessel C or the sieve N, are not liable to work into the tube F and to the gearing, to clog the same. It will also be noticed that the shaft G is wholly independent of the tube F, as the lower end of the shaft is journaled on the support B and the upper end of the cover D, which is replaced every time after the agitating devices have been interchanged.

In order to strengthen the tube F, the lower end thereof is provided with an inverted cup F', secured to or forming part of the bottom of the vessel C, the said cup F' having lugs F² adapted to fit over lugs B² forming part of the support B, so as to securely hold the vessel C in position on the support B and to firmly support the tube F in position in the vessel C.

It is understood that suitable locking devices are provided for locking the cover D and the sieve N in position on the vessel C.

It is understood that for various household purposes differently shaped agitators are provided so as to permit of conveniently using the device for churning cream and the like, for beating eggs, for whipping cream, etc.

When using the apparatus as an ice cream freezer, the construction shown in Fig. 4 is preferred, and in this case the support B³ is secured to the table A', and in it is journaled a driving shaft I' provided at its outer end with a crank arm J', and at its inner end with a bevel gear wheel H², in mesh on opposite sides with bevel gear wheels H³, H⁴. The bevel gear wheel H³ is secured to the lower end of the vertical shaft G³, extending upward through the tube F³, fixed in the vessel C' attached to the support B³, and mounted on a bearing K' screwed or otherwise secured in the support B³. To the upper end of the shaft G³ are secured agitating devices P, extending within a vessel Q, arranged within the vessel C', so that ice or other freezing medium can be packed between the vessels C' and Q. The bevel gear wheel H⁴ previously mentioned, is secured to the lower end of a hollow shaft R extending through the tube F³, and through which extends the shaft G³, and on the upper end of this hollow shaft R are secured agitating devices S, extending into the vessel Q, to co-act with the agitating devices P. Now when the operator turns the crank arm J', the shaft I' is rotated, and the rotary motion of the latter is transmitted by the gear wheels H², H³ and H⁴ to the shafts G³ and R, to rotate the said shafts G³ and R in opposite directions, to insure turning of the agitators P and S in opposite directions within the vessel Q.

If desired, the vessel Q may be attached to the upper end of the shaft G³, to rotate this vessel Q in unison with the agitators P.

From the foregoing, it will be seen that the agitating devices are driven by means extending from the bottom of the vessel C, up through the center thereof, and exit of the material contained in the vessel is prevented by the fixed tube F, through which extend the vertical portions of the driving means for the agitators. It will also be noticed that by the arrangement described, a quick interchange of agitators can be made so as to enable a person to utilize the device for various purposes, as described.

In order to prevent leakage of the contents of the inner receptacle Q, the latter is provided with a central tube Q', through which extends the fixed tube F³, as shown in Fig. 4.

Having thus described my invention, I claim as new and desire to secure by Letters Patent:

1. An apparatus of the class described, comprising a support provided with means for detachably securing it to a table, a vessel mounted on the support and having an open ended central tube extending to within a short distance of the top of the vessel, a perforated receptacle supported in the vessel above the bottom thereof, a vertical shaft having its lower end mounted in the support, said shaft extending through the tube of the vessel and having a polygonal portion adjacent its upper end and above the tube, a stirrer provided with an elongated hub having arms at its lower end shaped to fit the receptacle and a longitudinal bore, said hub fitting upon the tube and receiving the polygonal portion of the shaft with the end of the shaft projecting through the hub, a removable cover having on its inner face a central projection engaging the hub and in which the upper end of the shaft is mounted, a horizontal shaft mounted in the support and having a crank at its outer end, and gearing between the horizontal and vertical shafts.

2. In a device of the class described, a support provided with lugs, a vessel mounted upon the support and provided with a central open ended tube, the tube having an inverted cup-shaped lower end and provided on its inner face with lugs between which and the wall of the cup-shaped end the lugs of the support project, a cover for the vessel, a vertical shaft extending through the tube and journaled in the support and cover, a gear wheel on the shaft within the cup-shaped end of the tube, a stirrer secured upon the upper end of the shaft below the cover, and a horizontal shaft mounted in the support and having at its inner end a gear wheel meshing with the gear wheel of the vertical shaft.

In testimony whereof I have signed my name to this specification in the presence of two subscribing witnesses.

JACOB H. GENTER.

Witnesses:
ANNA COAN,
CLIFFORD H. BUCK.